United States Patent Office 2,779,700
Patented Jan. 29, 1957

2,779,700

FLAME RETARDANT POLYESTER RESINOUS COMPOSITIONS CONTAINING HALOGEN

Paul Robitschek, Buffalo, and Claude Thomas Bean, Jr., Niagara Falls, N. Y., assignors to Hooker Electrochemical Company, Niagara Falls, N. Y., a corporation of New York No Drawing. Original application September 10, 1952, Serial No. 308,921. Divided and this application January 3, 1956, Serial No. 561,698

18 Claims. (Cl. 154—43)

This invention relates to new resinous compositions, and to methods for their manufacture, comprising a polymerizable mixture of an unsaturated polyester (also referred to in the art as an unsaturated alkyd, or, unsaturated linear polyester or unsaturated polyester chain resins) and an unsaturated cross-linking agent, said mixture including a chemically combined component which imparts flame retardance to the polymerized mixture which is a chemical reaction adduct of hexahalocyclopentadiene with an unsaturated polycarboxylic acid or acid anhydride or acid halide or an unsaturated polyhydric alcohol, or esters thereof. This invention also relates to the polymerized flame retardant compositions in their finally reacted form, that is, as resinous, insoluble, infusible compositions, and to methods for their preparation.

The production of infusible, insoluble polyester resins which are flame retardant and have high resistance to heat is of considerable commercial importance. For instance, castings, moldings, foamed articles or laminated structures bonded by polyester type resins are for many uses required, or at least desired, to be resistant to fire and are also required to endure heat without deterioration. Typical illustrations of applications having such requirements is had in castings for live electrical contacts which must not be ignited by sparks or be deteriorated by heat generated therein. Structural members, such as pipes, wall coverings, panels, ash trays, etc, are further illustrations where flame retardance is desirable.

Heretofore certain chemical adducts have been disclosed as being useful in the preparation of ester resins. For example, it is known that the maleic acid-cyclopentadiene Diels-Alder adduct resulting from the diene synthesis and its reaction products with alpha, beta-unsaturated dicarboxylic acids or anhydrides and glycols form resinous compositions which may be made insoluble and infusible by further reaction with copolymerizable olefins to form a cross-linked polymer. Such compositions are chemically different from the products of this invention because the double bond remaining in the linear unsaturated polyester so produced is highly reactive and can enter directly into the cross-linking reaction, whereas, the corresponding linkage in the halogen-containing derivatives employed in making the compositions of this invention is non-reactive in said copolymerization reaction; moreover, they do not possess flame retardance. Attempts have been made to impart flame retardance to such hydrocarbon type resinous polyester compositions by incorporating therein inert fireproofing agents, such as antimony oxide or chlorinated paraffin wax, as fillers which do not enter into chemical reaction with the components of the resin; however, this results in a loss in the desirable properties, particularly with respect to heat resistance, which are usually associated with polyester resins, and the property to produce satisfactory articles of commerce may be seriously impaired. Other attempts to impart flame retardance are also known which involve chemically combining tetrachlorophthalic acid or anhydride in the polyester resin. Compositions so produced are chemically unrelated to the products of this invention; they have only poor flame retardant properties and they usually possess low stability and low strength at elevated temperatures; therefore, they are not entirely satisfactory for many applications. Still other attempts involving the use of certain unsaturated organic phosphorous compounds as cross-linking agents which impart flame retardance to the final polyester resin have likewise been found unsatisfactory.

It is an object of this invention to provide resinous compositions which are highly resistant to burning and yet possess many of the desirable characteristics usually associated with polyester resins. A further object is to provide resinous compositions which are highly resistant to exposure at elevated temperatures. A still further object is to prepare resinous compositions which are suitable for casting, molding, foaming or laminating and which are characterized by possessing the desirable properties usually required in the preparation of castings, moldings, foamed articles and laminates, and which are also characterized by being capable of forming articles of commerce which have a pleasing appearance and wide utility. A particular object of this invention is to make available in commerce compositions comprising a mixture of an unsaturated polyester and an olefinic cross-linking agent, with or without the presence of catalysts and/or inhibitors and/or chain terminating agents and/or promoters or accelerators, which are capable of polymerization to an insoluble, infusible, fire resistant polyester resin. A further objective is to provide methods for chemically combining hexahalocyclopentadienes in the form of an adduct into the polyesters. A still further objective is to provide methods for the preparation of these unsaturated polyesters and their combination with olefinic cross-linking agents. These objects, and still others which will become apparent to those skilled in the art on consideration of our specification and claims, are accomplished by the present invention.

In accordance with this invention the unsaturated polyester may contain the component which imparts flame retardance in either the polycarboxylic acid or anhydride unit and/or in the polyhydric alcohol unit of the polyester. The unsaturated polyester must contain unsaturation which is capable of copolymerization with the unsaturation in the cross-linking agent. Such copolymerizable unsaturation is an essential characteristic of the unsaturated polyester portion of the mixture of this invention. We have found that the double bond, remaining in a polyester chain, which is derived from the reaction adducts of hexahalocyclopentadienes with mono-olefinic polycarboxylic acids or anhydrides, or, mono-olefinic polyhydric alcohols or, esters thereof including acid chlorides is not sufficiently reactive to enter into the cross-linking reaction. We render such polyesters copolymerizable in the cross-linking reaction by incorporating in the esterification product a reactive and unsaturated chemical ingredient which retains its active unsaturation after being chemically combined in the polyester chain. Alternatively, or in addition to including flame retardant components in the unsaturated polyester, as just described, and in accordance with this invention, the cross-linking agent may contain the component which imparts flame retardance to the polyester resins of this invention.

The reactant components which impart flame retardance to the final polymerized resinous compositions included in this invention, i. e., the polyester resins, may best be prepared by effecting the chemical addition of a hexahalocyclopentadiene with an unsaturated polycarboxylic acid or acid anhydride or acid halide, or an unsaturated polyhydric alcohol, or esters thereof, presumably in accordance with the following equations, respectively, in which the specific reactants are given for purposes of illustration only:

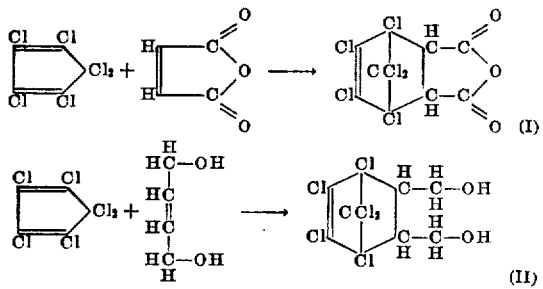

These, and similar Diels-Alder type reaction adducts of hexahalocyclopentadienes which are more fully disclosed hereinafter, can be esterified with a polyhydric alcohol or a polycarboxylic acid, to produce a soluble polyester chain containing the olefinic linkage originally present in the Diels-Alder adduct, as exemplified by the following product formed by esterification of the product of reaction (I) with ethylene glycol:

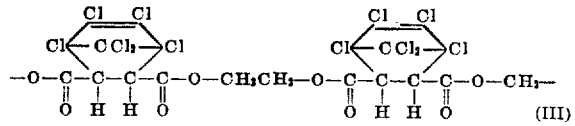

The olefinic linkage contained in such chlorine containing polyester chains (III), has been found by us to be unreactive in the copolymerization reaction with olefinic cross-linking agents, such as styrene, divinyl compounds, diallyl compounds, etc., even in the presence of the most active catalysts for such reactions. However, to render polyesters containing the Diels-Alder adducts of hexahalocyclopentadienes copolymerizable with olefinic cross-linking agents, whereby infusible, insoluble and flame retardant compositions may be produced, we introduce copolymerizable unsaturation into the polyester chain by esterifying the foregoing components in the presence of a reactive unsaturated chemical ingredient which is capable of rendering the polyester copolymerizable even after it is in chemical combination in the polyester molecule. A particularly suitable material for this use is maleic anhydride; however any unsaturated polycarboxylic acid or anhydride, or, polyhydric alcohol, or, esters thereof, including the acid chlorides, capable of esterification without losing its ability to copolymerize with olefinic cross-linking agents may be employed. Alternatively, or in addition to providing unsaturation in this manner, we may also provide for it by employing a Diels-Alder reactant with hexahalocyclopentadiene which has more than mono-olefinic unsaturation, for example a di-olefin or an acetylenic compound, and which retains, after being esterified in the polyester chain, an unsaturated linkage reactive in the cross-linking reaction.

The resinous compositions of this invention can be prepared by first effecting the esterification of the selected polycarboxylic acids with the desired polyhydric alcohols in the preesnce of the reactive unsaturated chemical ingredient, whereby an unsaturated polyester is formed; then mixing the resulting composition with the chosen copolymerizable olefinic cross-linking agent; and, thereafter copolymerizing the mixture to form an insoluble, infusible polyester resin. Another method which may be employed for producing resinous compositions of this invention which is in accordance with our findings comprises effecting the chemical addition of hexahalocyclopentadiene to less than the total theoretical number of olefinic linkages contained in an unsaturated polyester molecule. For example, by effecting the Diels-Alder reaction of one molecule of hexahalocyclopentadiene with more than one molecule of ethylene glycol maleate, a product is produced which contains the hexahalocyclopentadiene in chemical combination in the polyester chain and which also contains active unsaturation which is copolymerizable in the cross-linking reaction; the product so produced is then combined with the chosen olefinic cross-linking agent and thereafter copolymerized in a manner similar to that described. Esterification of the desired ingredients may be effected in the presence of esterification catalysts and/or chain terminating agents, etc. A preferred procedure involves introducing the selected ingredients to be esterified, in predetermined proportions, into a suitable esterification vessel provided with heating and/or cooling means, an agitator, means for maintaining an atmosphere of an inert gas such as nitrogen or carbon dioxide over the reaction mixture, means for removing water of esterification, an inlet, an outlet, and any other accessories necessary for the reaction. The charged reactants are blanketed with an inert atmosphere, then agitated and heated to effect the reaction for the specified period of time. After the desired degree of reaction has been attained, as conveniently determined by employing the acid number technique or measuring the amount of water liberated, the reaction mixture is cooled. The resulting product, if solid, and if prepared in accordance with the first procedure described, is broken up and then mixed with the olefinic cross-linking agent at room temperatures, preferably in the presence of a polymerization inhibitor. If prepared in accordance with the second method, a hexahalocyclopentadiene is chemically added to a soluble unsaturated polyester molecule in an amount insufficient to react out all the double bonds in the polyester and the material resulting by this treatment is then compounded with the olefinic cross-linking agent.

We have found that the cross-linking agent may be advantgeously combined with unsaturated polyesters prepared in accordance with these methods while the unsaturated polyester is at an elevated temperature and that the olefinic cross-linking agent may also be at an elevated temperature thereby facilitating solution and mixing. To prevent premature polymerization at this stage, a polymerization inhibitor is advantageously added to the mixture, or preferably to one of its components prior to mixing, especially if the mixture is to be stored or shipped in commerce prior to curing or effecting the copolymerization reaction into the insoluble, infusible polyester resin. Alternatively, or in addition to including a polymerization inhibitor, a catalyst and/or promoter for the copolymerization may be added, particularly if it is desired to make available in commerce a composition which is ready for polymerization and does not require further chemical additions in order to be used, as is commonly known in the art.

In order that this invention may be more readily understood and to further illustrate the details thereof, the following examples are given which show preferred compositions of this invention and methods for their preparation. Certain of the Diels-Alder adducts of hexahalocyclopentadienes disclosed herein are new compositions of matter which are more fully described, including methods for their preparation, and claimed in the copending applications hereinafter identified.

In the following examples, in which parts are given by weight unless otherwise stated, the common properties of the resins were determined by the generally accepted procedures known in the art. The following physical properties are determined as follows: Flame retardance is reported as burning rate in inches per minute determined by ASTM Designation D757–49. Flame retardance after heat aging is determined by using the ASTM procedure on samples heat aged at 200 degrees centigrade for three days and two weeks. Heat resistance is reported as crushing strength in pounds after aging of a cylindrical casting 1⅛ inches in diameter and one inch long which has been heat aged at 200 degrees centigrade for a specified length of time of three days, one week, two weeks, four weeks, eight weeks and sixteen weeks. Compression creep is the decrease in length measured in inches of a cylindrical casting 19/32 of an inch in diameter and one inch long under a fixed load of about 350 pounds at a given temperature for a predetermined time. Temperatures of 80, 100 or 120 degrees centigrade and a period of one-half hour are selected in making the determinations. Crushing strength is the pressure necessary, in pounds, applied in 1,000 pound increments at ten second intervals, to crush, fracture or compress at constant pressures a cylindrical casting 1⅛ inches in diameter and one inch long, measured at room temperature. Hot crushing strength is crushing strength in pounds measured at temperatures of 100 degrees centigrade.

EXAMPLE 1

Fifty-two and eight-tenths parts of ethylene glycol and 90 parts of diethylene glycol were charged into an esterification or resin vessel provided with heating and/or cooling means, an agitator, means for maintaining an atmosphere of an inert gas over the reaction mixture, means for removing water of esterification, temperature recording means, charging inlets and outlets, etc. The charge was blanketed with an inert atmosphere of nitrogen, agitated, heated to a temperature between about 80 to 100 degrees centigrade, then 394.7 parts of 1,4,5,6,7,7 - hexachlorobicyclo - (2.2.1) - 5 - heptene-2,3-dicarboxylic anhydride (hereinafter referred to as HET), prepared by the method which involves the Diels-Alder reaction of hexachlorocyclopentadiene with maleic anhydride, was blended into the agitated glycols. Seventy and eight-tenths parts of maleic anhydride was then blended into the charged reactants while the reaction mixture was being raised to a temperature of about 160 to 170 degrees centigrade by application of external heat. The water of esterification liberated during the reaction was separated and periodically measured and the acid number of the reaction mixture was also periodically measured to determine the progress of the reaction. When an acid number of approximately 55 was approached, 3.6 parts of tetrahydrofurfuryl alcohol was added to the reaction mixture. Upon reaching an acid number of about 45, the entire contents of the reaction vessel was cooled, then cast into pans under an inert atmosphere. A transparent, faintly colored, hard, brittle, soluble material, having a 38.4 percent by weight chlorine content, which melts in a temperature range above room temperature and below 100 degrees centigrade and has a specific gravity at room temperature of about 1.45 was obtained.

EXAMPLE 2

One hundred grams of the cast product recovered in Example 1 was broken into small lumps, then added in small portions, with agitation, to 30 grams of styrene maintained under an inert atmosphere, containing 0.03 gram of hydroquinone, until completely dissolved. Complete solution consumed a period of more than 24 hours even with continued vigorous agitation. The resulting mixture was a clear, substantially colorless solution having a viscosity of about 30 poises at 25 degrees centigrade on a Gardner bubble viscometer.

EXAMPLE 3

Fifty parts of the mixture prepared in Example 2 were agitated with 0.5 part of a catalyst mixture comprising 50 parts of benzoyl peroxide and 50 parts of tricresyl phosphate. The resulting mixture was cast in 10 millimeter diameter glass tube and set by heating at a temperature of about 80 degrees centigrade for a period of about one-half hour. A hard, tough, clear, insoluble, infusible substantially colorless polyester resin was obtained which has a 30 percent chlorine content by weight and is immediately self-extinguishing on removal from an oxidizing flame.

In a manner after Examples 1 to 3, and under substantially the same conditions unless otherwise stated, the following compositions, given in Tables I and II, were prepared by employing the proportions of ingredients stated. The properties of the final formulations were determined by the methods described herein and are also reported in the tables.

Table I

| Ex. No. | HET (mols) | Maleic Anhydride (mols) | Ethylene Glycol (mols) | Diethylene Glycol (mols) | Propylene Glycol (mols) | Tetrahydrofurfuryl Alcohol (mols) | Reaction Temp., °C. | Final Acid Number | Styrene/Resin Wt. Ratio | Viscosity of Solution at 21° C. (poises) | Chlorine Content (percent) | Specific Gravity | Flame Retardance (in./min.) | Crushing Strength (pounds) |
|---|---|---|---|---|---|---|---|---|---|---|---|---|---|---|
| 4 | 1.75 | 1.09 | 1.37 | 1.37 | | 0.055 | 155 | 49 | 30/100 | | 30 | 1.45 | 0.187 | 21,500 |
| 5 | 1.42 | 1.42 | 1.37 | 1.37 | | 0.055 | 155 | 49 | 30/100 | 64 | 27 | 1.44 | 0.184 | 21,000 |
| 6 | 1.95 | 0.650 | 1.25 | 1.25 | | 0.050 | 155 | 50 | 30/100 | 62 | 33 | 1.47 | 0.114 | 15,500 |
| 7 | 1.89 | 0.952 | 2.74 | | | 0.055 | 155 | 49 | 30/100 | 300 | 33 | 1.48 | 0.070 | |
| 8 | 1.89 | 0.952 | | 2.74 | | 0.055 | 155 | 50 | 30/100 | 44 | 29 | 1.43 | 0.287 | 18,000 |
| 9 | 1.616 | 1.097 | | | 2.584 | 0.055 | 160 | 49 | 30/100 | | 30 | | | 23,000 |
| 10 | 1.89 | 0.952 | 1.37 | 1.37 | | 0.055 | 155 | 80 | 30/100 | 38 | 31 | 1.47 | 0.13 | 14,000 |
| 11 | 1.89 | 0.952 | 1.37 | 1.37 | | 0.055 | 155 | 26 | 30/100 | 303 | 31 | 1.43 | 0.23 | 20,000 |

Table II

| Ex. No. | HET (parts) | Maleic Anhydride (parts) | Fumaric Acid (parts) | Itaconic Acid (parts) | Citraconic Anhydride (parts) | Sebacic Acid (parts) | Ethylene Glycol (parts) | Diethylene Glycol (parts) | Triethylene Glycol (parts) | Allyl Glycerol Ether (parts) | Thiodiglycol (parts) | Reaction Temp., °C. | Final Acid No. | Styrene/Resin Wt. Ratio | Chlorine Content | Flame Retardance |
|---|---|---|---|---|---|---|---|---|---|---|---|---|---|---|---|---|
| 12 | 105.4 | | | 35.0 | | | 16.7 | 28.6 | | | | 148 | 57 | 30/100 | 27 | (¹) |
| 13 | 105.4 | | | | 30.5 | | 16.7 | 28.6 | | | | 148 | 55 | 30/100 | 27 | (¹) |
| 14 | 105.4 | 26.4 | | | | | | | 81.0 | | | 148 | 54 | 30/100 | 22 | (¹) |
| 15 | 105.4 | 18.5 | | | | 16.3 | 16.7 | 28.6 | | | | 148 | 42 | 30/100 | 26 | (¹) |
| 16 | 105.4 | 26.4 | | | | | | | | 71.1 | | 158 | 54 | 30/100 | 25 | (¹) |
| 17 | 105.4 | 26.4 | | | | | | | | | 65.8 | 158 | 45 | 30/100 | 24 | (¹) |
| 18 | 600 | | 128 | | | | 80.6 | 137.2 | | | | 165 | 46 | 30/100 | 30 | (¹) |

¹ Self-extinguishing when removed from an oxidizing flame.

The following examples illustrate the employment of various monomeric olefinic cross-linking agents in formulating compositions of this invention with a cast unsaturated polyester similar to that recovered in Example 1. The casting was broken into small lumps, then 100 parts were mixed with 30 parts by weight of the olefinic cross-linking agents indicated in the examples given in Table III. The characteristics of the resulting mixtures are given in the table as well as some of the physical properties of the final polymerized polyester resins, which were made in a manner after Example 3.

and cast under an inert atmosphere. A transparent, faintly colored, hard, brittle product, which melts at a temperature around 100 degrees centigrade, was obtained.

Ten parts of the product so obtained was ground up and agitated with 0.5 part of a catalyst comprising 50 parts benzoyl peroxide and 50 parts of tricresyl phosphate;

*Table III*

| Ex. No. | Olefin | Characteristics of Mixture | Properties of Polyester Resins | | |
|---|---|---|---|---|---|
| | | | Chlorine Content, percent | Flame Retardance | Compression Strength, lbs. |
| 19 | Diallyl Phthalate | Very Viscous | 30 | (¹) | 21,000 |
| 20 | Allyl Diglycol Carbonate | do | 30 | (¹) | 18,000 |
| 21 | Methylmethacrylate | Viscous | 30 | (¹) | |
| 22 | Diallyl Benzenephosphenate | Very Viscous | 30 | (¹) | 17,000 |
| 23 | Vinyl Benzoate | Viscous | 30 | (¹) | 19,000 |
| 24 | Diallyl Maleate | do | 30 | (¹) | 25,000 |
| 25 | Vinyl Acetate | do | 30 | (¹) | 12,000 |

¹ Self-extinguishing on removal from an oxidizing flame.

The following examples illustrate the employment of olefinic cross-linking agents containing the component which imparts flame retardance as an unsaturated ester of a Diels-Alder adduct of hexachlorocyclopentadiene and maleic anhydride.

EXAMPLE 26

Twenty-four and two tenths parts of a sample of the cast soluble and fusible product produced in a manner after the foregoing examples, particularly, Examples 1 and 4, was dissolved in 9.7 parts of diallyl 1,4,5,6,7,7-hexachlorobicyclo-(2.2.1) -5-heptene - 2,3 - dicarboxylate, said compound and its method of preparation being disclosed and claimed in the co-pending application S. N. 308,945, filed September 10, 1952, involving the esterification of 1,4,5,6,7,7-hexachlorobicyclo-(2.2.1)-5 - heptene-2,3-dicarboxylic anhydride with allyl alcohol. To the mixture, which was a viscous, colorless solution, was added 0.68 part of benzoyl peroxide. The resulting mixture was cured by heating and a rigid, tough, substantially colorless, infusible, insoluble, polyester resin casting having an approximate chlorine content of 41 percent was obtained which is immediately self-extinguishing on removal from an oxidizing flame.

EXAMPLE 27

Another sample of an unsaturated polyester casting similar to that used in Example 26 was dissolved in a 50–50 mixture by weight of styrene and diallyl 1,4,5,6,7,7-hexachlorobicyclo-(2.2.1)-5 - heptene - 2,3 - dicarboxylate and this was cured by the addition of catalytic amounts of benzoyl peroxide and the application of external heat. An insoluble, infusible flame retardant polyester resin, having a chlorine content of approximately 34 percent which was similar to that obtained in the foregoing example was recovered.

The following example illustrates the unreactivity of the olefinic linkage in the reaction product of 1,4,5,6,7,7-hexachlorobicyclo-(2.2.1)-5-heptene-2,3-dicarboxylic anhydride with ethylene glycol in the cross-linking reaction.

EXAMPLE 28

Thirty-four parts of ethylene glycol and 200 parts of 1,4,5,6,7,7-hexachlorobicyclo-(2.2.1) -5-heptene - 2,3 - dicarboxylic anhydride were charged into an esterification vessel. The reactants were maintained under an inert atmosphere of nitrogen, agitated and heated to a temperature of 160 degrees centigrade. The water of esterification liberated during the reaction was separated and the acid number of the reaction mixture was periodically measured to determine the progress of the reaction. When the acid number of the reaction mixture reached a value of about 30, the entire contents of the reaction vessel was cooled the mixture so obtained was heated, under an inert atmosphere, at a temperature of 175 degrees centigrade for a period of sixteen hours. A dark brown polymer, which was a liquid at the elevated temperature and a solid at room temperature and soluble in benzene, was recovered. An infusible, insoluble resin was not produced, therefore no cross-linking took place.

Twenty parts of the polyester obtained by the esterification reaction described above was agitated with one part of a catalyst comprising 50 parts of benzoyl peroxide and 50 parts of tricresyl phosphate; the mixture so obtained was dissolved in ten parts of styrene and then heated at a temperature of about 80 degrees centigrade for a period of sixteen hours to yield a brittle, cloudy resin which melted at a temperature of about 175 degrees centigrade and was soluble in benzene. An infusible, insoluble material was not produced therefore no cross-linking took place.

The following example illustrates the difference in time required to effect complete solution of the type unsaturated polyester produced in Example 1 when proceeding in accordance with a preferred method of our invention as compared to the method used in Example 2.

EXAMPLE 29

About 100 parts of hot molten unsaturated polyester having an acid number of about 45 prepared in a manner after Example 1, was removed from the reaction vessel prior to cooling and casting, and while it was at an elevated temperature of between about 100 to 130 degrees centigrade, the molten polyester was mixed, under an inert atmosphere, into 30 parts of hot styrene containing 0.03 part of hydroquinone which was maintained at a temperature of about 80 to 100 degrees centigrade. Complete solution to a clear, substantially colorless, viscous liquid having a viscosity of about 30 poises at 25 degrees centigrade was obtained within one minute.

The following example illustrates a novel process for preparing resinous compositions in accordance with this invention.

EXAMPLE 30

Equimolar proportions of ethylene glycol and maleic anhydride were reacted at a temperature up to 220 degrees centigrade until an acid number of approximately 125 was attained. The reaction mixture was cooled to about 130 degrees centigrade, then one-half mol hexachlorocyclopentadiene per mol of maleic anhydride and 0.16 mol of hydroquinone per mol of maleic anhydride originally esterified was blended into the reaction mixture. The reaction was continued at about 130 degrees centigrade for about eight hours, at the end of which time a fusible, acetone and benzene soluble polyester resin was recovered having hexachlorocyclopentadiene chemically combined into the polyester chain and also containing at least 50 percent of the original number of olefinic linkages as capable of entering into the cross-linking reaction.

About 100 parts of the product was mixed with 30 parts of styrene to form a solution and this mixture was polymerized by the addition of 1.3 parts of benzoyl peroxide at a temperature of about 50 degrees centigrade. An infusible, insoluble, hard, tough, amber colored material was obtained which is self-extinguishing on removal from an oxidizing flame.

The following example illustrates the employment of 1,4,5,6,7,7-hexachlorobicyclo-(2.2.1)-5-heptene-2,3-dicarboxylic acid in place of the anhydride as given in some of the foregoing examples.

EXAMPLE 31

In a manner after Example 1, the following ingredients were reacted in a resin vessel in the proportions indicated: 1,4,5,6,7,7-hexachlorobicyclo-(2.2.1)-5-heptene-2,3-dicarboxylic acid—560 parts; maleic anhydride—95.6 parts; ethylene glycol—71.3 parts; diethylene glycol—121.5 parts and tetrahydrofurfuryl alcohol—4.6 parts.

The foregoing ingredients were reacted until an acid number of 43.g was attained, whereupon the contents of the reaction vessel was cooled and then cast under an inert atmosphere. The casting was a transparent, substantially colorless, hard, brittle unsaturated polyester, which when dissolved in 30 percent by weight of styrene and copolymerized, employing the benzoyl peroxide catalyst, gave a polyester resin having a chlorine content of 30 percent and a crushing strength of 19,000 pounds.

The following examples show various derivatives of hexachlorocyclopentadienes as being useful in preparing the compositions of this invention.

EXAMPLE 32

Sixteen and seven tenths parts of ethylene glycol and 28.6 parts of diethylene glycol were charged into a resin vessel similar to that described in Example 1, then blanketed with an inert atmosphere, agitated, and heated to a temperature of about 100 degrees centigrade. To this agitated charge were added 105.4 parts of 1,4,5,6,7,7-hexachloro-2-methylbicyclo-(2.2.1)-5 - heptene - 2,3 - dicarboxylic anhydride, said compound and its method of preparation being disclosed and claimed in our co-pending application S. N. 308,924, filed September 10, 1952, involving the Diels-Alder reaction of hexachlorocyclopentadiene with citraconic anhydride. Twenty-six and four tenths parts of maleic anhydride was then blended into the charged reactants. The reaction mixture was raised to a temperature of about 160 to 170 degrees centigrade, by the application of external heat and the water of esterification liberated was separated. When an acid number of approximately 77 was reached, the entire contents of the reaction vessel was then cast into pans under an inert atmosphere. A transparent, substantially amber colored, hard, brittle, soluble unsaturated polyester, which melts in a temperature range between room temperature and below 100 degrees centigrade and has a specific gravity at room temperature of about 1.44 was obtained.

One hundred and five parts of the cast unsaturated polyester product recovered was broken into small lumps and dissolved in 31.5 parts of styrene containing 0.031 part of hydroquinone. This solution was copolymerized by the addition of 0.5 part of a polymerization catalyst made up of benzoyl peroxide and tricresyl phosphate. The resulting mixture was cast in a standard testing glass tube and cured at a temperature of about 50 degrees centigrade. A hard, tough, clear, amber colored, infusible, insoluble polyester resin having a chlorine content of 26 percent which is immediately self-extinguishing on removal from an oxidizing flame was obtained.

The following example illustrates the employment of a half ester, for example, mono-alkyl ester, in place of the dicarboxylic anhydride or acid which was used in some of the foregoing examples.

EXAMPLE 33

Sixteen and six tenths parts of ethylene glycol and 28.4 parts of diethylene glycol were charged into a resin vessel similar to that described in Example 1, then blanketed with an inert atmosphere, agitated, and heated to a temperature of about 100 degrees centigrade. To this agitated charge were added 114.4 parts of the mono-methyl ester of 1,4,5,6,7,7-hexachlorobicyclo-(2.2.1)-5-heptene-2,3-dicarboxylic acid; said compound being prepared by the method involving the Diels-Alder reaction of hexachlorocyclopentadiene with maleic anhydride followed by esterification of the adduct so produced with the amount of methanol required to produce the mono-methyl ester. Twenty-six and four tenths parts of maleic anhydride was then blended into the charged reactants. The reaction mixture was raised to a temperature of about 165 degrees centigrade, by the application of external heat and the water of esterification liberated was separated. When an acid number of approximately 32 was reached the entire contents of the reaction vessel was cast into pans under an inert atmosphere. The hard, brittle, unsaturated polyester recovered was dissolved in 30 parts of styrene. The solution produced was cured in the presence of a peroxide catalyst at a temperature of about 80 degrees centigrade for a period of about 30 minutes to yield a hard, infusible, insoluble polyester resin. The polyester resin recovered has a chlorine content of approximately 30 percent and is immediately self-extinguishing on removal from an oxidizing flame.

The following example illustrates the employment of an adduct of hexachlorocyclopentadiene with an unsaturated polyhydric alcohol, in preparing the compositions of this invention.

EXAMPLE 34

Twenty-four and five tenths parts of maleic anhydride and 101.3 parts of 3-(1,4,5,6,7,7-hexachlorobicyclo-(2.2.1)-5-heptene-2-yl)-methoxy-1,2 - propanediol, said compound and its method of preparation being described in our co-pending application S. N. 308,922, filed September 10, 1952, involving the Diels-Alder reaction of hexachlorocyclopentadiene with alpha allyl glycerol ether, were charged into a resin vessel similar to that described in Example 1, then blanketed with an inert atmosphere, agitated and heated to 160 degrees centigrade for sixteen hours. A very light-yellow, hard, brittle resin was obtained, having an acid number of 43. This resin was compounded with 30 parts of styrene and 0.03 part of hydroquinone per hundred parts of resin; this gave a light colored viscous liquid containing 33 percent chlorine. The compounded resin, catalyzed by one percent of its weight of benzoyl peroxide, cured to a hard, tough, light colored polymer which was insoluble and infusible, and immediately self-extinguishing on removal from an oxidizing flame.

The following example illustrates the use of a mixed halocyclopentadiene adduct in preparing the compositions of this invention.

EXAMPLE 35

Five and two tenths parts ethylene glycol and 8.9 parts of diethylene glycol were charged in a resin vessel similar to that described in Example 1, then blanketed with an inert atmosphere, agitated, and heated to a temperature of about 100 degrees centigrade. Thirty parts of 1,4,5,6-tetrachloro-7,7-difluorobicyclo-(2.2.1)-5-heptene-2,3 - dicarboxylic acid, said compound and its method of preparation being described in co-pending application S. N. 308,934, filed September 10, 1952, involving the reaction of 1,2,3,4-tetrachloro-5,5-difluorocyclopentadiene with maleic anhydride, and 8.3 parts of maleic anhydride were added to the mixture of glycols and the temperature was raised to 160 degrees centigrade, which temperature was maintained for sixteen hours. A yellow, hard, brittle resin, having an acid number of 34 and chlorine content of 23 percent was obtained. One hundred parts of the resin was compounded with 30 parts of styrene and 0.03 part of hydroquinone. A viscous solution was obtained which was catalyzed with one of its weight of benzoyl peroxide and cast. A hard, tough, transparent casting was obtained. The hardened resin had a crushing strength of 18,000 pounds per square inch and this strength was retained after aging for four weeks at 200 degrees centigrade, after which only seven percent by weight of the material was lost. The resin was immediately self-extinguishing upon removal from an oxidizing flame.

The following example, illustrates the use of a chemical adduct of hexachlorocyclopentadiene and fumaric acid in preparing compositions of this invention.

EXAMPLE 36

Six and two tenths parts of ethylene glycol and 10.6 parts of diethylene glycol were charged in a resin vessel similar to that described in Example 1, then blanketed with an inert atmosphere, agitated and heated to a temperature of about 100 degrees centigrade, whereupon 28.9 parts of an adduct formed from fumaric acid and hexachlorocyclopentadiene, and 9.8 parts of maleic anhydride were added. The reaction temperature was 155 degrees centigrade, raising to 185 degrees centigrade during the course of 20 hours. At the end of this period a light colored, clear, hard, brittle resin was obtained. On compounding 100 parts of this resin with 30 parts of styrene and 0.03 part of hydroquinone, a viscous solution was obtained which was catalyzed with one percent of its weight of benzoyl peroxide and cast. A hard, tough resin was obtained which gave a crushing strength of 18,000 pounds per square inch and was immediately self-extinguishing upon removal from an oxidizing flame.

The following example, illustrates the use of a chemical adduct of hexachlorocyclopentadiene and itaconic anhydride in preparing compositions of this invention.

EXAMPLE 37

Thirteen and two tenths parts of ethylene glycol and 22.4 parts of diethylene glycol were charged into a resin vessel similar to that described in Example 1, then blanketed with an inert atmosphere, agitated and heated to a temperature of about 100 degrees centigrade, 108 parts of 1,4,5,6,7,7-hexachlorobicyclo-(2.2.1)-5-heptene-2-acetic-2-carboxylic anhydride, said compound and its method of preparation being described in our co-pending application S. N. 308,923, filed September 10, 1952, and now United States Patent 2,752,361, involving the reaction of hexachlorocyclopentadiene with itaconic anhydride, and 17.4 parts of maleic anhydride were added to the mixture of glycols and the reactants were heated at 160 degrees centigrade for sixteen hours. A hard, brittle resin was obtained. One hundred parts of this resin were compounded with 30 parts of styrene and 0.03 part of hydroquinone to give a viscous solution having a chlorine content of 28 percent and an acid number of 40. The solution, catalyzed with one percent of its weight of benzoyl peroxide, cured to a hard, tough resin, which was immediately self-extinguishing upon removal from an oxidizing flame.

The following examples illustrate the preparation of laminates by employing the compositions of this invention; certain characteristics of articles produced are also given.

EXAMPLE 38

To a sample of a polymerizable mixture prepared in a manner after Example 2 was added one percent by weight of a benzoyl peroxide polymerization catalyst. The resultant material was spread on three ply fiber glass mat then cured into a molding ten by ten inches by one-eighth of an inch in thickness, at a temperature of 250 degrees Fahrenheit, for a period of four minutes. The resulting polyester resin laminate had good transparency. When supported on its edges it withstood repeated blows from a hammer without breaking.

Another sample of the polymerizable mixture of this invention prepared in a manner after Example 2 and containing one percent by weight of benzoyl peroxide polymerization catalyst was mixed with 30 percent by weight of calcium carbonate filler and then molded in a glass fiber laminate in a manner after that just described. Samples of the polyester resin laminates so prepared were tested and found to have the following properties: thickness in inches—0.14; specific gravity—1.75; combustion weight loss in percent—64.8; average impact strength in foot pounds per inch of width—15.9; dry strength in pounds per square inch—26,000; strength in pounds per square inch after boiling in water for two hours—23,100; longitudinal modulus of elasticity (in flexure) $1.57 \times 10^6$.

The following example illustrates the typical properties of a preferred composition of this invention obtained by casting in the manner which has already been described.

EXAMPLE 39

A polymerizable mixture of unsaturated polyester and styrene prepared in a manner after Examples 1 and 2 possessed the following physical properties:

| | |
|---|---|
| Viscosity at 25° C. | Approximately 27 poises. |
| Color | Below 100 APHA. |
| Odor | Styrene. |
| Clarity | Transparent. |
| Specific gravity at 23° C. | 1.36. |
| Refractive index at 21.5° C. | 1.5517. |
| Polyester concentration | 77%. |
| Percent chlorine | 30%. |
| Acid number | Approximately 35. |

The resin was found to have only a 4.9 percent shrinkage in volume when fully cured in the presence of one percent by weight of benzoyl peroxide at 80 degrees centigrade for about one-half hour. The cured polyester resin is a hard, tough, transparent material having a specific gravity of 1.43 and an ASTM burning rate of 0.26 inch per minute immediately after it was prepared. After being heat aged for three days at 200 degrees centigrade it had a burning rate of 0.16 inch per minute and after two weeks of heat aging at 200 degrees centigrade it had a burning rate of 0.14 inch per minute. This was an entirely unexpected but desirable property because with time and use the resin acquires more flame retardance, rather than losing it, as is commonly encountered with other polyester resins in the art. The initial crushing strength of the polyester resin was found to be 17,500 pounds at room temperature and 13,000 pounds at a temperature of 100 degrees centigrade (i. e., hot compression strength). The crushing strength after heat aging at a temperature of 175 degrees centigrade was determined after one, two, four and eight weeks of such heat aging and was found to be at least 17,000 pounds, even after the eight week period. The compression creep of the resin was determined and found to be 0.166 inch at 80 degrees centigrade, 0.263 inch at 100 degrees centigrade and 0.273 inch at 120 degrees centigrade. The resin has been found to withstand exposure to ultraviolet light, even under an RS sunlamp, without discoloring. Although the resin has a thirty percent chlorine content, there have been no indications of toxicity which are commonly encountered with chlorinated compounds. The polyester resin does not cause dermatitis on handling by humans. Examination of the fumes evolved by exposing the cured resin to temperatures as high as 350 degrees centigrade do not indicate the presence of any objectionable toxic chlorinated materials which is indeed an unusual property to be associated with highly chlorinated materials. The electrical properties of the resin were found to be as follows:

| Frequency | Dielectric Constant | Dissipation Factor |
| --- | --- | --- |
| $10^3$ | 3.36 | 0.0050 |
| $10^6$ | 3.12 | 0.0135 |
| $10^9$ | 2.85 | 0.0164 |
| $8.6 \times 10^9$ | 2.76 | 0.0143 |

The following example illustrates a molding formulation containing a composition of this invention and the molded product resulting therefrom.

EXAMPLE 40

A molding formulation was compounded by mixing 80 grams of styrenated resin prepared after the manner of Example 2 with 1.6 grams of a mixture of 50 parts of benzoyl peroxide and 50 parts of tricresyl phosphate and intermittently blending into the solution, 60 grams of glass fiber cut into two inch lengths. This material was placed in a two inch diameter mold then subjected to a temperature of 120 degrees centigrade and a pressure of 2,000 pounds per square inch. A hard, disc one-half inch thick was obtained. The molding was self-extinguishing on removal from an oxidizing flame, shock resistant even when dropped from a two-story building on a concrete pavement and had a pleasing appearance.

The processing techniques and the chemical reactions depicted herein for producing the necessary ingredients to be used in making the compositions of this invention are subject to various modifications and the proportions of ingredients may also be varied without departing from our invention.

The temperature for carrying out the reaction between the polyhydric alcohols and polybasic acids ranges from 100 degrees centigrade to 200 degrees centigrade, although higher or lower temperatures can be used; preferably around 150 degrees centigrade to 180 degrees centigrade is advantageously employed.

An inert gas such as nitrogen is passed through the mixture in a preferred procedure to accelerate the progress of the reaction and allow for good color of the product. The progress of the reaction is followed by measuring the rate of water liberated, by the viscosity of the resin, by its acid number, or by other methods commonly known in the art. The extent to which the reaction is carried out will depend on a number of factors, such as the desired viscosity, melting point, duration of reaction, etc.

Esterification catalysts such as para-toluene sulfonic acid, benzene sulfonic acid, beta naphthalene sulfonic acid, etc., or amines such as, pyridine, triethyl amine, quinoline, etc., may be added to the reaction mixture.

The proportion of polyhydric alcohol is approximately controlled by the total mol proportion of acids in the esterification reaction mixture. In making certain compositions of our invention we prefer to react the polyhydric alcohols and polybasic acids in a roughly equimolar proportion, however, either the acids or alcohols may be in substantial excess, if it is desired to form a low molecular weight polyester resin.

A chain stopper may be added in a minor proportion depending on the molecular weight of the linear unsaturated polyester chain desired, in order to rapidly terminate the growth of the unsaturated polyester chain during the esterification reaction and when the desired acid number is being approached, or, to reduce the number of free carboxyl or hydroxyl groups, or, to introduce a hydrocarbon terminal residue. Among the compounds which may be used as chain stoppers during the esterification reaction whereby the unsaturated polyester chain is produced are a wide variety of monohydric alcohols, such as, butyl, hexyl, octyl, dodecyl, benzyl, tetrahydrofurfuryl, etc., or, monobasic acids such as, acetic, propionic, butyric, ethyl hexoic, benzoic, etc.

The solution or mixture of unsaturated polyester and olefinic crosslinking agent is preferably made while the unsaturated polyester is still hot, as illustrated among the foregoing examples, thereby facilitating rapid solution. Alternatively, the unsaturated polyester may be cooled and stored and when ready for mixing may be heated in order to facilitate solution in the olefin, which may also be heated. The solution may, of course, be made in the cold, especially if there is any possibility of explosion in handling the hot olefinic cross-linking agent or if polymerization of the olefinic cross-linking agent cannot be prevented when at elevated temperatures even by the presence of inhibitors therefor.

The proportion of olefinic cross-linking agent to unsaturated polyester may be varied within the ultimate limits of each without departing from the scope of this invention, in order to make the solution or mixture of this invention which may be set to the infusible, insoluble, polyester resin. For example, only a small proportion of olefinic cross-linking agent is needed when the proportion of reactive cross-linking olefinic bonds in the unsaturated polyester is very small; and a still smaller proportion of olefinic cross-linking agent may be employed if it is desired to react only a part of the total of said unsaturated bonds in such polyester in the cross-linking reaction. On the other hand, a major proportion of olefinic cross-linking agent to unsaturated polyester may be employed when the proportion of reactive cross-linkable olefinic bonds in the unsaturated polyester is high; and a still higher proportion of olefinic cross-linking agent will be required if it is desired to react a major part of the total of said unsaturated bonds in such polyester in the cross-linking reaction. In general, the concentration of the unsaturated polyester in the olefinic cross-linking agent may vary between about 10 and 90 percent. In certain formulations and in order to accentuate a large number of desirable properties in the polyester resin produced, we find it preferable to employ between about 15 and 45 percent of the olefinic cross-linking agent, e. g. styrene, when the unsaturated polyester is similar to that produced in Example 1, however, it is to be understood that this preferred concentration is a variable which is dictated by the particular properties of the materials employed and the particular properties desired in the polyester resin produced.

Polymerization inhibitors, usually of the order of 0.001 to 1 percent of the composition may be added to prevent premature polymerization. Among the inhibitors which may advantageously be employed to prevent the premature polymerization of the mixture of unsaturated polyester and olefinic cross-linking agents, particularly if the mixture is to be stored or shipped in commerce prior to curing, are substances such as hydroquinone, benzoquinone, para-tertiary-butyl catechol, para-phenylene diamine, trinitrobenzene, picric acid, etc.

Polymerization catalysts are preferably added to the mixture of unsaturated polyester and olefinic cross-linking agent to effect setting or curing. Catalysts such as benzoyl peroxide, acetyl peroxide, lauroyl peroxide, methyl ethyl ketone peroxide, cumene hydroperoxide, etc., have been found satisfactory. Such catalysts are used in a proportion of 0.01 to 10 percent depending on the efficiency of their action and whether or not substances which inhibit polymerization are present in the mixture to be cross-linked. The polymerization reaction may also be hastened by effecting it in the presence of promoters such as metals or metal salts, cobalt resinate, cobalt maleate, cobalt naphthenate, etc., or, by amines such as dibutyl amines, or mercaptans such as dodecyl mercaptan, etc. These are used in proportions similar or smaller to that stated for catalysts.

The polymerization conditions for effecting the crosslinking reaction between the unsaturated polyesters of this invention and the olefinic cross-linking agent may be selected from a wide variety of techniques but usually involve the application of heat or light. Although pressure is not a required condition for effecting polymerization of the polymerizable mixtures embraced within this invention, thereby providing for a decided advantage over other insoluble, infusible resins known heretofore, it is sometimes advantageously employed, particularly when it is desired to make laminates in preformed shape. The pressures found satisfactory for this purpose are relatively low compared to those required for molding or laminating other type resins than involved herein and may be of the order of that obtained by pressing glass plates having a fiber glass mat or laminate impregnated with the polyester resin sandwiched therebetween.

The temperature at which polymerization is effected depends on a variety of factors, particularly the boiling point of the olefinic cross-linking agent and the exothermic characteristics of the polymerization mixture. A temperature is selected which will give a suitable reaction rate and yet not cause substantial volatilization, and in the case of producing very thick castings, which will not produce a product which is crazed, cracked, etc.

Various hexahalocyclopentadienes may be employed in making compositions embraced within the scope of this invention such as the chloro, bromo and fluoro substituted cyclopentadienes wherein all of the hydrogens are replaced by one or more of the foregoing halogens. While hexachlorocyclopentadiene is today the most readily available commercial hexahalocyclopentadiene, we have found that the mixed perhalo compounds are useful in making Diels-Alder adducts which can be chemically combined into the saturated polyester compositions of this invention.

In fact, hexachlorocyclopentadiene in which one or two of the chlorine atoms has been replaced with bromine, appears to afford an even higher degree of flame retardance in the polyester resins. The polyester resins made from a hexahalocyclopentadiene in which some of the chlorine of hexachlorocyclopentadiene has been replaced with fluorine atoms, are exceedingly interesting materials possessing enhanced heat resistance and aging properties. The foregoing applies whether the hexahalocyclopentadiene is utilized of a raw material in the making of the copolymerizable linear polyester or the unsaturated cross-linking agent.

The compounds useful in making adducts of hexahalocyclopentadienes are dienophiles having a plurality of esterifiable groups. These functional groups capable of esterification and having utility herein are found in compounds such as substituted or unsubstituted acids, anhydrides, acid halides, alcohols and esters, as hereinbefore illustrated.

The hexahalocyclopentadiene radical may be combined into the polycarboxylic acid unit of the unsaturated polyester chain in a variety of ways such as by effecting the Diels-Alder reaction of the hexahalocyclopentadiene with unsaturated polycarboxylic acids such as maleic or fumaric; substituted maleics or fumarics such as, citraconic, chloromaleic, mesaconic, and pyrocinchonic; acetylene dicarboxylic acids; and also ethylenic substituted succinic anhydrides or acids, such as, aconitic and itaconic, etc. Instead of employing the polycarboxylic acids or anhydrides in the Diels-Alder reaction, adducts of hexahalocyclopentadiene with substances which produce an equivalent polyester chain upon reaction with a polyhydric alcohol can be used; for instance, acid chlorides, or, esters of the acids or anhydrides may also be used. A typical illustration is had in the Diels-Alder reaction of hexachlorocyclopentadiene with fumaryl chloride to produce 1,4,5,6,7,7-hexachlorobicyclo-(2.2.1)-5-heptene-2,3-dicarbonyl chloride followed by the esterification of this with ethylene glycol and maleic anhydride to produce the unsaturated polyester. In place of the acid chloride, diesters such as, dimethyl maleate may be employed.

The hexahalocyclopentadiene radical may be combined into the polyhydric alcohol unit of the unsaturated polyester chain in a variety of ways such as, by effecting the Diels-Alder reaction of the hexahalocyclopentadiene with unsaturated polyhydric alcohols such as, butene-diol or pentene-diol, etc. Other suitable compounds are ethers or esters derived from polyhydric alcohols having at least three hydroxyl groups, one of which is esterified or etherified with an unsaturated alcohol or acid reactive with hexahalocyclopentadiene in the diene synthesis. For instance, allyl or vinyl glycerol ethers, allyl or vinyl pentaerythritol ethers; and unsaturated acid esters of glycerol or pentaerythritol, etc., such as, acrylic or methacrylic esters thereof may be used. Instead of employing a polyhydric alcohol in the Diels-Alder reaction, adducts of hexahalocyclopentadienes with substances which produce an equivalent unsaturated polyester chain, upon reaction with a polycarboxylic acid can be used; for instance, esters of the alcohols may also be used.

The unsaturated polyester chains produced by effecting the Diels-Alder reaction of hexahalocyclopentadiene with an unsaturated polycarboxylic acid or polyhydric alcohol, followed by the esterification of the product so produced with a polyfunctional alcohol or acid, can be rendered copolymerizable by chemically combining in such polyester chains, a reactive and unsaturated chemical ingredient which retains its active unsaturation after its chemical combination into the polyester chain. Among the materials which may gainfully be employed for this purpose are the unsaturated polycarboxylic acids such as, maleic, fumaric, citraconic, itaconic, acetylene dicarboxylic and esters and halogen substituted derivatives thereof, etc.; the unsaturated polyhydric alcohols such as, butene-diol, pentene-diol, etc., also unsaturated hydroxy ethers such as, allyl or vinyl glycerol ethers, allyl or vinyl pentaerythritol ethers, etc.; and, still other chemical compounds comprising an ethylenic or an acetylenic linkage which are not rendered unreactive in the polyester chain by their chemical combination into the polyester chain by way of other functional groups, whereby the mixed esters of adducts of hexahalocyclopentadiene are produced.

Another method of providing for copolymerizable unsaturation in the polyester chain which may be employed involves: effecting the diene synthesis of hexachlorocyclopentadiene with a polybasic alcohol or acid or ester, or equivalents thereof, which contains at least two olefinic linkages, one of which is reactive in the diene synthesis, while the others which are unreacted, are capable of being copolymerizable in the cross-linking reaction. Among the materials which are useful for this purpose are acetylenic compounds and di-olefinic and poly-olefinic compounds.

Alternatively, or in addition to including the flame retardant component in the unsaturated polyester, we have found that the chlorine content of the final polyester formulations may be obtained, or, substantially increased, by employing a cross-linking agent which also contains the component which imparts flame retardance to the final compositions of this invention. Among such cross-linking agents which may be useful for this purpose are the following: Diallyl-1,4,5,6,7,7-hexachlorobicyclo-2.1)-5-heptene-2,3-dicarboxylate; Diallyl-1,4,5,6,7,7-hexachloro-2-methylbicyclo-(2.2.1)-5-heptene - 2,3 - dicarboxylate; Diallyl-1,2,4,5,6,7,7-heptachlorobicyclo-(2.2.1)-5-heptene-2,3-dicarboxylate; and Triallyl-1,4,5,6,7,7-hexachlorobicyclo-(2.2.1)-5-heptene - 2 - acetate-2,3-dicarboxylate. These compounds can be prepared by reacting hexachlorocyclopentadiene with the indicated dicarboxylic acid and esterifying the resultant product with an unsaturated alcohol such as allyl alcohol. Other cross-linking agents may advantageously be employed; for example, reaction products of hexachlorocyclopentadiene with isoprene or butadiene retaining a reactive unsaturated linkage can be used as cross-linking agents directly without further reaction. Still other methods for the preparation of the unsaturated cross-linking agents, employing type reactions known to the art, will be apparent from the foregoing. In addition materials such as triallyl cyanurate may be employed for improving heat resistance; divinyl benzene, monochlorostyrene, dichlorostyrene, diallyl phthalate, diallyl maleate and similar mono- or polyvinyl or mono- or poly-allyl derivatives are also useful.

It is apparent from a consideration of the foregoing examples and the foregoing discussion that the particular chemical ingredients selected and their relative proportions may be varied over a wide range to produce a wide variety of compositions embraced within this invention. It should be emphasized that modifications can be made to accentuate any given property or combination of properties desired. For example, hardness in the final polyester resin can be varied by using a short chain polyhydric alcohol and acids or long chain polyhydric alcohols and acids; the viscosity of the mixture comprising the unsaturated polyester and the olefinic cross-linking agent may be varied by changing the ratio of unsaturated polyester to olefinic cross-linking agent; and the curing characteristics of such mixtures can be varied by changing the kind and proportion of polymerization catalyst employed. In order to accentuate both flame retardance and heat resistance, we prefer that the hexachlorocyclopentadiene content should not comprise less than ten percent by weight of the polyester resin composition; the upper limit for the hexachlorocyclopentadiene content is generally dictated by practical limits determined by the minimum necessary concentration of glycols and unsaturated dibasic acids not being adducts of hexachlorocyclopentadiene and olefins to give resinous compounds capable of being hardened and this upper limit is about 60 percent. Flame retardance may be accentuated by adding to the unsaturated polyester containing the hexachlorocyclopentadiene component, a cross-linking agent which also contains the flame retardant component made from hexachlorocyclopentadiene in chemical combination therewith. It may be further accentuated by esterifying a polycarboxylic acid and polyhydric alcohol which each contain the hexahalocyclopentadiene flame retardant component of this invention and cross-linking this with a fire resistant cross-linking agent. Mechanical strength can be accentuated, for example, by employing diallyl diglycol carbonate as the cross-linking agent with a linear unsaturated polyester resin of this invention, similar to that given in Example 20, and forming glass cloth laminates one-eighth inch in thickness. The flexural strength at room temperature of such a laminated resin is as high as 85,000 pounds per square inch and modulus of elasticity is $4.16 \times 10^6$ pounds per square inch.

The properties of the compositions of this invention can be varied substantially by incorporating modifying agents before, during or after any of the processing steps employed. For example, instead of producing articles of commerce from the compositions of this invention which are in the form of castings or laminates as previously described herein, a foamed type article may be made by incorporating a small percentage of a foaming agent such as sodium bicarbonate into the solution of unsaturated polyester dissolved in mono-olefin and thereafter effecting the copolymerization in the presence of catalyst and heat to produce the foamed article. Formulations which are useful for making moldings embodying the compositions of this invention may be made by mixing into the unsaturated linear polyester and olefinic cross-linking agent mixture, an inert filler such as chopped fiber glass rovings, macerated fabric, asbestos fibers, mica, etc., which serve as fibrous reinforcing media and incorporating a small percentage of a mold lubricant, catalyst and/or promoter.

An infinite variety of products may also be prepared, which embody the compositions of this invention, by copolymerizing the linear unsaturated polyester materials produced in accordance with this invention, as in Example 1, with a mono-olefinic cross-linking agent in the presence of another copolymerizable linear polyester material having different structure than that produced by this invention. For example, by dissolving 23.1 parts of the product of Example 1 and 4.3 parts of an unchlorinated commercial polyester resin dissolved in styrene especially designed for imparting flexibility and designated as Paraflex P-13 (made by Rohm & Haas Company, Philadelphia, Pennsylvania) and 2.3 parts by weight of styrene and effecting the copolymerization of the mixture by a catalyst a material is produced which has better flexibility and different properties than any materials produced heretofore. It is to be understood that dyes, pigments, plasticizers, lubricants and various other modifying agents are contemplated as being incorporated in certain formulations to produce compositions embraced in this invention in order to obtain or accentuate any given property.

We claim:

1. A polymerizable mixture comprising (A) a polymerizable linear polyester of ingredients comprising (1) an adduct of hexahalocyclopentadiene and a polyhydric alcohol containing aliphatic carbon to carbon unsaturation, wherein the halogen is selected from the group consisting of chlorine, bromine, fluorine and mixtures thereof, and (2) a polycarboxylic acid containing aliphatic carbon to carbon unsaturation, and (B) a polymerizable compound containing aliphatic carbon to carbon unsaturation.

2. A composition of claim 1 wherein the (1) adduct is of hexachlorocyclopentadiene and is of a dihydric alcohol containing ethylenic unsaturation, wherein said (2) polycarboxylic acid is dicarboxylic and contains ethylenic unsaturation, and wherein said (B) polymerizable compound is monomeric and contains ethylenic unsaturation.

3. A composition of claim 2 having a polymerization inhibitor added thereto.

4. A composition of claim 2 when polymerized to an infusible, insoluble resinous composition.

5. A composition of claim 2 when mixed with an inert filler and polymerized to an infusible, insoluble resinous composition.

6. A reinforced plastic article comprising a composition of claim 2 when polymerized to an infusible, insoluble resinous composition and a fibrous reinforcing medium.

7. A laminated article comprising a plurality of sheets of glass fibrous material and as a binder therefor, an infusible, insoluble flame retardant resinous composition resulting from the polymerization of a composition defined in claim 2.

8. A composition of claim 2 when having at least ten percent by weight of halogen content of the total mixture.

9. A composition of claim 2 wherein the adduct is 2,3-dimethylol-1,4,5,6,7,7-hexachlorobicyclo-(2.2.1)-5 - heptene.

10. A composition of claim 2 wherein the adduct is 2,3-dimethylol-1,4,5,6,7,7-hexachlorobicyclo-(2.2.1) - 5-heptene and wherein said (2) polycarboxylic acid is maleic anhydride and wherein said (B) copolymerizable compound is styrene.

11. A composition of claim 2 wherein the adduct is 3-(1,4,5,6,7,7-hexachlorobicyclo-(2.2.1)-5 - heptene - 2-yl)-methoxy-1,2-propanediol.

12. A composition of claim 2 wherein the adduct is 3-(1,4,5,6,7,7-hexachlorobicyclo-(2.2.1)-5 - heptene - 2-yl)-methoxy-1,2-propanediol and wherein said (2) polycarboxylic acid is maleic anhydride and wherein said (B) copolymerizable compound is styrene.

13. A composition of matter comprising: a polymerizable linear polyester of ingredients comprising an adduct of hexahalocyclopentadiene and a polyhydric alcohol containing aliphatic carbon to carbon unsaturation, wherein the halogen is selected from the group consisting of chlorine, bromine, fluorine and mixtures thereof; and a polycarboxylic acid containing aliphatic carbon to carbon unsaturation.

14. A composition of claim 13 wherein the adduct is of hexachlorocyclopentadiene and is of a dihydric alcohol containing ethylenic unsaturation and wherein said polycarboxylic acid is dicarboxylic and contains ethylenic unsaturation.

15. A composition of claim 14 wherein the adduct is 2,3-dimethylol-1,4,5,6,7,7-hexachlorobicyclo - (2.2.1) - 5-heptene.

16. A composition of claim 14 wherein the adduct is 2,3-dimethylol-1,4,5,6,7,7-hexachlorobicyclo-(2.2.1) - 5-heptene and wherein the polycarboxylic acid is maleic anhydride.

17. A composition of claim 14 wherein the adduct is 3-(1,4,5,6,7,7-hexachlorobicyclo-(2.2.1) - 5 - heptene - 2-yl)-methoxy-1,2-propanediol.

18. A composition of claim 14 wherein the adduct is 3-(1,4,5,6,7,7-hexachlorobicyclo-(2.2.1)-5-heptene - 2-yl)-methoxy-1,2-propanediol, and wherein the polycarboxylic acid is maleic anhydride.

No references cited.

UNITED STATES PATENT OFFICE

CERTIFICATE OF CORRECTION

Patent No. 2,779,700

January 29, 1957

Paul Robitschek et al.

It is hereby certified that error appears in the printed specification of the above numbered patent requiring correction and that the said Letters Patent should read as corrected below.

Column 3, line 59, for "preesnce" read -- presence --; column 4, line 32, for "advantgeously" read -- advantageously --; column 9, line 25, for "43.g" read -- 43.5 --; column 16, line 66, for "2.1)" read -- (2.2.1) --.

Signed and sealed this 10th day of December 1957.

(SEAL)

Attest:

KARL H. AXLINE
Attesting Officer

ROBERT C. WATSON
Commissioner of Patents